Dec. 23, 1952     T. P. LANDERS ET AL     2,622,415
CHILLING FOODSTUFFS
Filed June 23, 1948     4 Sheets-Sheet 1
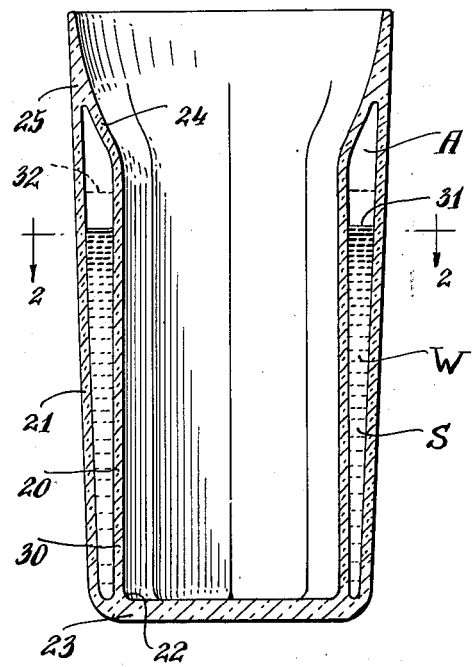
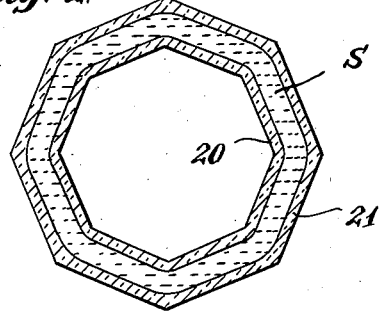
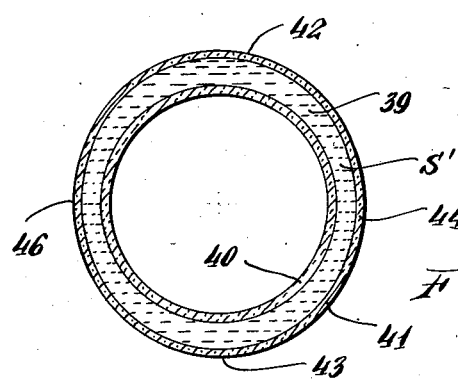
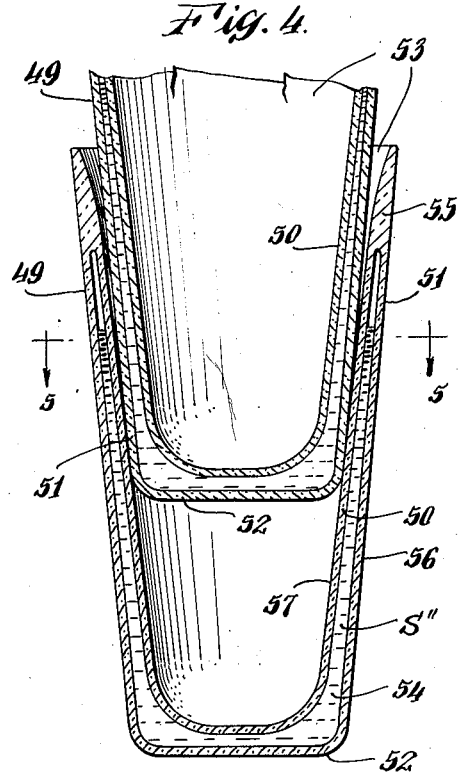
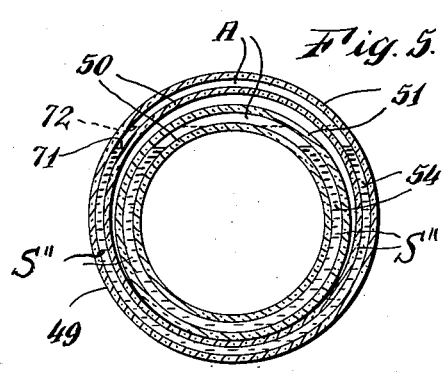
INVENTORS
Thomas P. Landers
and Charles F. Smith
BY Frank A. Bower
ATTORNEY Dec. 23, 1952 T. P. LANDERS ET AL 2,622,415
CHILLING FOODSTUFFS
Filed June 23, 1948 4 Sheets-Sheet 2

Thomas P. Landers and Charles F. Smith INVENTORS
BY Frank A. Bower
ATTORNEY.

Dec. 23, 1952 — T. P. LANDERS ET AL — 2,622,415
CHILLING FOODSTUFFS
Filed June 23, 1948 — 4 Sheets-Sheet 3

Thomas P. Landers and Charles F. Smith INVENTORS
BY Frank A. Bower
ATTORNEY.

Dec. 23, 1952   T. P. LANDERS ET AL   2,622,415
CHILLING FOODSTUFFS
Filed June 23, 1948   4 Sheets-Sheet 4
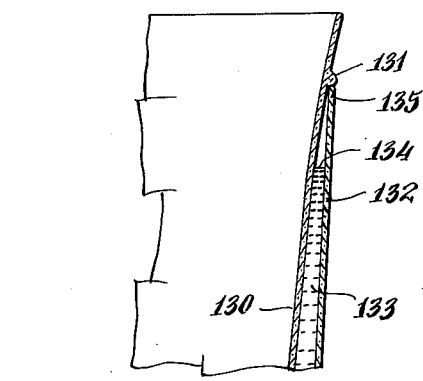
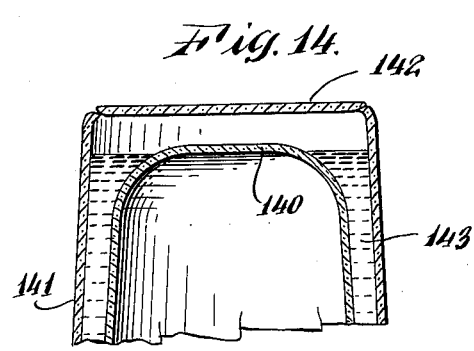
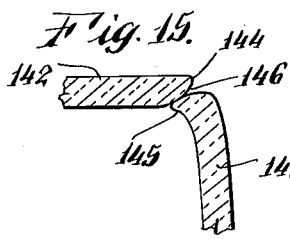
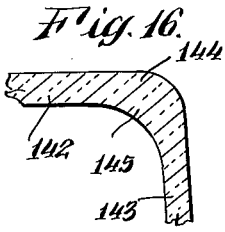
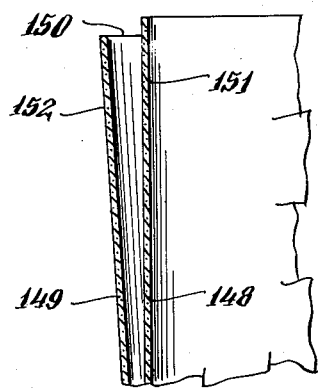
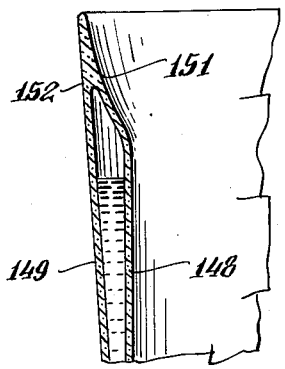
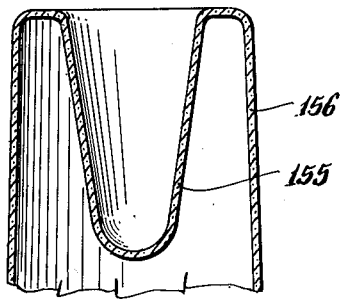
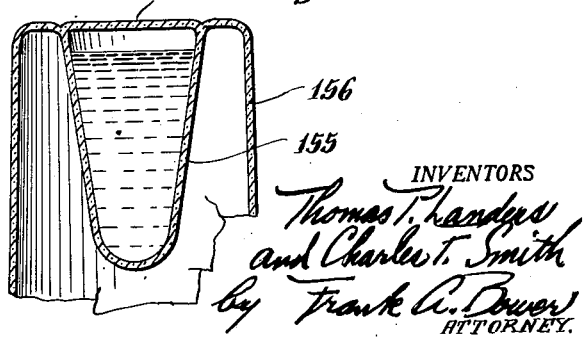
INVENTORS
Thomas P. Landers
and Charles T. Smith
by Frank A. Bower
ATTORNEY.

Patented Dec. 23, 1952

2,622,415

UNITED STATES PATENT OFFICE 2,622,415

CHILLING FOODSTUFFS

Thomas P. Landers, New York, and Charles F. Smith, Yonkers, N. Y.

Application June 23, 1948, Serial No. 34,704

1 Claim. (Cl. 62—142)

This invention relates to receptacles for food, drinks and the like and particularly to a drinking receptacle including a liquid medium acting to cool the contents of the receptacle.

The object of the invention is to provide a drinking receptacle having a cooling medium which may be chilled to desired cooling condition and particularly to providing a cooling medium adapted to be frozen to solid form to be melted during the serving of the drink.

Further objects of the invention particularly in the structure of the receptacle and the system of cooling and solidifying its liquid medium will appear from the following specification taken in connection with the accompanying drawings in which:

Fig. 1 is a vertical sectional view of a typical container with the liquid cooling jacket;

Figs. 2 and 3 are sectional views of typical modifications showing different transverse sections taken on the line 2—2 of Fig. 1;

Fig. 4 is a vertical sectional view illustrating a modified form of container;

Fig. 5 is a transverse sectional view showing comparative transverse sections of the container of Fig. 4 lying horizontally.

Figs. 13, 14, 15, 16, 17, 18, 19 and 20 are partial views illustrating the formation of the receptacle.

Figure 6:
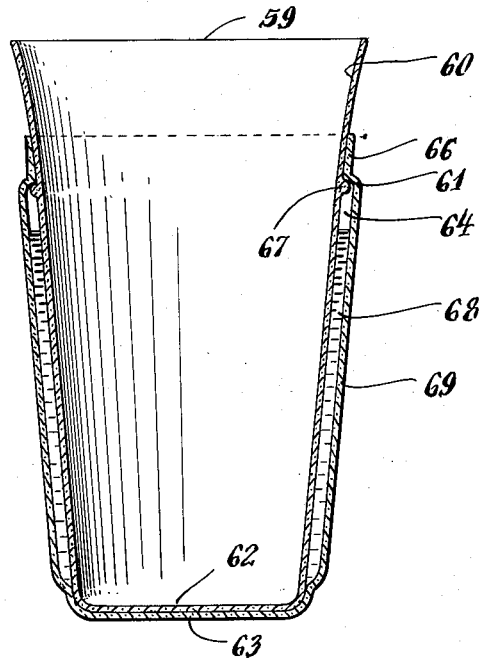
Figs. 6, 7, 8, 9, 10, 11 and 12 are vertical sections of various containers of modified form illustrating the principles of this invention.

In the specific embodiment shown in Fig. 1 the receptacle is of glass or other material molded or cast into the form shown including an inner jacket 20 within the drinking receptacle 21 having a space S of annular formation between them. This space is air-tight and contains a partial filling of liquid, for instance, water W and air A.

The inner container 20 merges at the bottom 22 with the bottom 23 of the outer receptacle 21 and at the top flares outward at 24 to merge with the upper portion of said outer receptacle. Preferably the inner and outer container 20, 21 are spaced apart at a slight angle to gradually increased separation toward the top. Preferably also the inner and outer containers 20, 21 depart from the circular form in transverse section (Fig. 2) so that pressure between them will tend to change their shapes slightly in the direction of increasing the space between them and so to some extent accommodating an expansion of the water W into ice. For instance, the outer and inner containers may be of matched generally octagonal formation as indicated in Fig. 2.

When the receptacle of Figs. 1 and 2 is placed in a freezing compartment of sufficiently low temperature to freeze the water in the space S the first effect is to chill the outer receptacle 21 correspondingly contracting it and very slightly raising the level of the water in the jacket. The beginning of the cooling of the inner container 20 contracts this a little with corresponding tendency to increase the volume of space S. These tendencies continue with progressive cooling of the water W to the freezing point and then as the ice forms it starts along the inner surface of the outer glass 21 and builds up to be under compression between the walls 20, 21 at some point 30 toward the bottom, for instance. Such compression is resisted sufficiently by the walls to cause a slight distortion expanding the outer and pressing in the inner walls to provide a counter pressure squeezing the ice formation and causing it to expand upward in the direction of the divergence of the walls.

This continues progressively until the water W is entirely frozen with a rise in its level, for example, from 31 to 32 (Fig. 1) correspondingly contracting the air space A. In this form the receptacle is now ready for use, though some further chilling will usually occur depending on the temperature of the freezing compartment.

When removed for use the warmer atmosphere and the handling of the receptacle begins to raise the temperature of the outer receptacle 21 and the beginning of the warming of the inner container 20 follows and is sharply increased, for instance, by the pouring in of the liquid being served. These heatings are quickly communicated to the ice ring in the jacket tending to melt thin films on each vertical surface so that in effect the ice ring sits in these films and is soon free to slip upward as the melting proceeds. In this way the ice eventually floats toward the upper portion of the space S augmenting the cooling effect there until the melting is complete.

The drink in the receptacle is correspondingly cooled and kept cool without any contact with the cooling liquid W.

In Fig. 3 the drinking receptacle of Fig. 1 is modified so that an outer receptacle 41 oval in shape contains an inner receptacle 40 which is more nearly circular in section. A space S' provided between the walls of the inner receptacle 40 and the outer receptacle 41 is consequently wide at the end points 42 and 43 of the oval shaped outer jacket and tapers from the end points 42 and 43 to the center points 44 and 46. The center points 44 and 46 are thus the narrowest points in the space S' when the cooling fluid which is contained between the receptacles 40 and 41 is in the liquid phase.

According to this invention when the drinking receptacle of the modification shown in Fig. 3 is cooled to freeze the liquid coolant the water or other coolant begins to turn into ice at the coolest points in the chamber 39 which contains the coolant. Consequently, the ice forms first on the outer walls of the chamber 39. As the cooling progresses the thickness of the ice layer on the chamber walls increases and continues, the two layers approaching each other until they converge. When the layers have formed a solid mass between the walls of the chamber 39 they exert a pressure of expansion. This expansion between the receptacles 40 and 41 if not compensated for or relieved can reach a degree sufficient to fracture or crack either of the walls permanently damaging the drinking receptacle. According to the invention as set forth in the modification of Fig. 3, the ice first extends from inner receptacle 40 to outer receptacle 41 at or in the region of the center points 44 and 46, being the narrowest regions in the space S' of the chamber 39, the points where the cold will best penetrate from wall to wall if all other characteristics are constant. At the time that the ice first extends from wall to wall in chamber 39 at the points 44 and 46, some of the water will remain liquid at or in the region of the end points 42 and 43 where the escape of heat will be slowest. As the ice forms at points 44 and 46 and expands to cause inward pressure on the inner receptacle 40 and outward pressure on the outer receptacle 41 the outer receptacle 41, being of an oval shape, will yield at points 44 and 46 to the pressure exerted by the ice and be forced outward to assume a shape more nearly a perfect circle. This tendency can be aided by making the outer receptacle 41 thinner than the inner receptacle 40. At the same time that the center points 44 and 46 move outward the end points 42 and 43 of receptacle 41 will tend to flatten and move inward also in the direction of becoming more nearly a perfect circle. The resiliency of the outer receptacle 41 with its tendency to change from an oval to a circular shape when placed under pressure increases the enclosed area and relieves the force of the ice expansion and prevents damage to the drinking receptacle.

By making the outer glass of lower coefficient of expansion than the inner glass the resulting larger contraction of the inner wall will tend to relieve the ice pressure, particularly at temperatures below freezing, and in Fig. 3 the wedge shape of the space S proceeding from the points 44 and 46 to the points 42 and 43 also provides a relief for expansion of the freezing liquid from the freezing zone which releases the pressure exerted at points 44 and 46. Thus, as the ice layers extend from wall to wall of the chamber 39 in the region around the points 44 and 46 the expanding ice may shove away from the constricted areas where the freezing is occurring toward the liquid areas in the region of 42 and 43 and thus relieve the pressure between the chamber walls in the frozen zone.

Figs. 4 and 5 show a further modification of the jacket cooled drinking receptacle. In this modification space S'' containing a liquid 54 in the walls of the drinking receptacle 49 is wedge shaped in the opposite direction from that of space S in the drinking receptacle shown in Figs. 1 and 2. Thus the narrowest part of the space S between the inner receptacle 50 and the outer receptacle 51 is at the upper end of the space S'' and the two receptacles are fused to form a lip 55 around the top of the drinking receptacle 49. The inner and outer receptacles 50 and 51 making up the drinking receptacle 49 are flared from a narrow base 52 to a relatively wide mouth 53 at the top of the drinking receptacle along a straight surface so that the outer surface 56 of one of the drinking receptacles according to this modification will fit easily and snugly into the inner surface 57 of another of the drinking receptacles according to this modification for a distance of over half of the total height of the receptacles. This nesting of the receptacles permits an economy of the space occupied by the receptacles which is of advantage particularly during the step of cooling or freezing the coolant.

As the space S'' tapers from a narrow zone at the lip end 55 of the glass to the base 52 of the glass 49, the drinking receptacle does not relieve the pressure of the expansion of ice as the liquid freezes according to the invention as described in connection with Fig. 1 when the drinking receptacle stands upright on its base. However, as the space S'' does widen as the base 52 is approached, relief of the ice pressure may be obtained according to the principles above described by freezing the coolant with the drinking receptacle inverted or placed on its side. To demonstrate cooling the drinking receptacle 49 on its side, Fig. 5 shows a horizontal section of two drinking receptacles 49. In Fig. 5 the upper drinking receptacle is shown inside the lower drinking receptacle and overlapping the walls of the lower receptacle at the bottom when viewed from the large end of the receptacles. The coolant is shown contained in the spaces S'' between outer receptacles 51 and inner receptacles 50 and as the space S'' is not entirely filled with water an area A of air rises to the upper side of the recumbent drinking receptacles 49. As in the case of the freezing coolant in the Fig. 1 and Fig. 3 disclosures the pressure of the expanding ice, as the coolant freezes, will be relieved in the drinking receptacles of Fig. 5 by an accommodation of the expansion into the air space A so that the level of the ice in Fig. 5 will be at a point 72 above level 71 of the unfrozen liquid 54.

In Fig. 6 is shown a composite drinking receptacle 59 composed of glass and a relatively soft plastic. In this modification an inner receptacle 60 is composed of glass. Around the outside of this receptacle 60 is jacketed an outer receptacle 61 of a resilient plastic. The bottoms 62 and 63 of the inner and outer receptacle respectively are suitably sealed together while the side walls are separated to provide a chamber 64 which is partially filled with water 68 or other suitable liquid coolant. At its upper end 66 the outer receptacle 61 is fitted over a bead 67 encircling the outside of the receptacle 60 and the receptacle 61 is securely sealed to the receptacle 60. The seals at 66 and between bottoms 62 and 63 are watertight to confine the coolant 68 to the chamber 64. The outside 69 of the plastic receptacle 61 may be suitably ornamented.

In operation according to this invention, this modification may be cooled to change the liquid coolant 68 to ice which will provide the desired cooling to liquids or other substances placed within the inner receptacle. In this modification the expansion of the coolant upon solidifying into ice is accommodated by the resilience of the material making up the outer jacket 61. The force of the expanding ice is absorbed by the stretching of the walls of the receptacle 61 within their elastic limit so that upon the melting of the ice the walls return to their normal shape.

Figure 7:
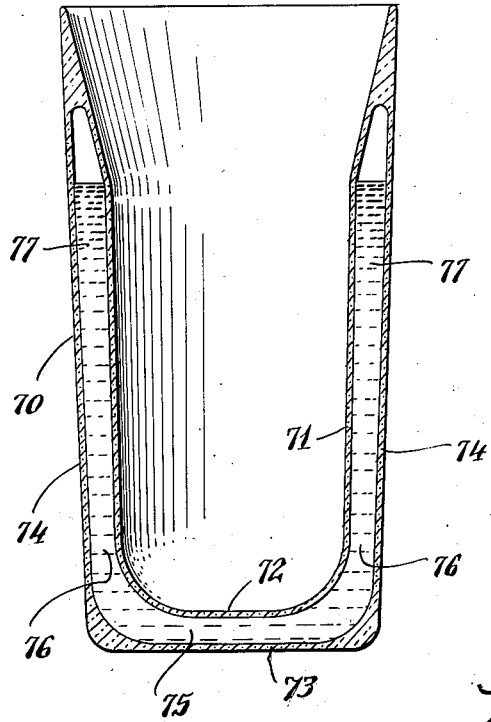

In the glass 70 of Fig. 7 the inside wall 71 is cylindrical and has a bottom 72 spaced from the bottom 73 of the outer wall 74 which expands slightly upward so that typical dimensions are 1/8" spacing at 75 and 76 and 1/4" spacing at 77, the inner diameter of the inner wall being about 2½".

Figure 8:
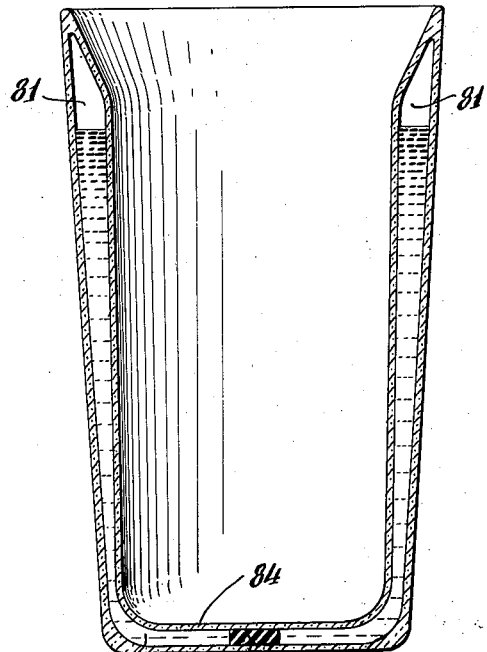

In Fig. 8 the jacket walls are expanded apart in an upward direction from 1/8" at the bottom 80 to 1/4" at the top 81, and as indicated at 82 a small disk of yielding material may be held in place at the center between the bottom walls 83, 84 to cushion the expansion during freezing. This disk may be of cork or soft rubber or the like.

Figure 9:
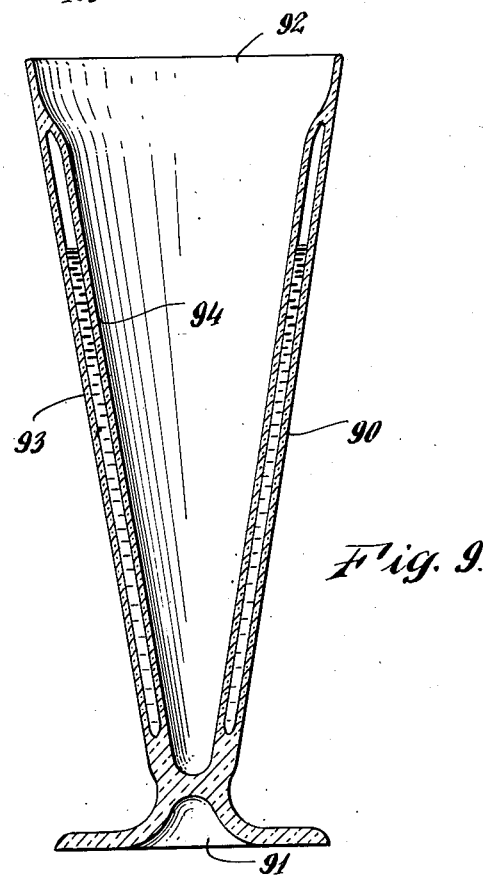

In Fig. 9 the "Beer" glass 90 is of thinly tapered shape with base 91 and wide open top 92. The jacket walls 93, 94 are preferably parallel with the liquid in annular conical form. The preferred freezing procedure will position the glass open side up as shown with the air cushion annular at the top so that the resultant expansion at any and all points will cause the annular column to creep up, such expansion being also accommodated by the natural divergence of the jacket walls. The inner wall 94 is preferably circular in transverse sections and the outer wall may be slightly oval (Fig. 3). Whatever the position of the glass the initial solidifications will be in contact with the liquid which in turn is cushioned by the air at the top surface. The beer or other beverage poured into the glass will melt the inner film of ice and will then be retained at a low temperature by the melting of the remaining ice and by the insulating effect of the jacket. The cone of ice during melting will tend to float upward in contact with the inner wall 94 and separated from the surrounding atmosphere by the outer wall 93 and the intervening liquid layer so as to retain the chilled condition of the drink over a long period.

Figure 10:
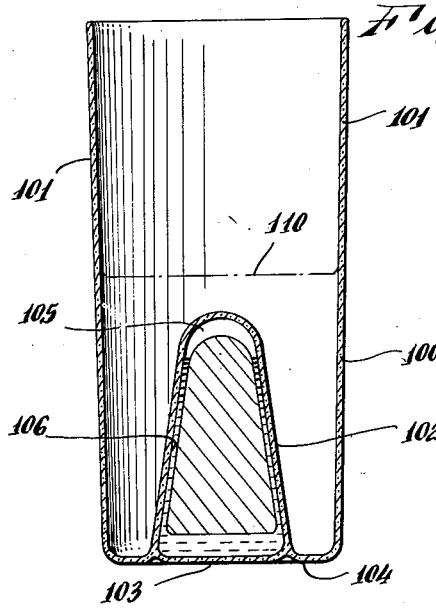

The "Highball" glass 100 of Fig. 10 has plain, nearly parallel sides 101, the cooling being provided by the hollow mound 102 in the center of the lower part of the glass. This inner enclosure is of generally conical form with its base 103 merging with the bottom 104 of the glass. It is preferably frozen in reclining or upside-down position, the drawing showing the ice mass formed by the latter and just beginning to melt. At the top 105 is the air which has risen from the bottom and at the bottom the water in which the ice mass sinks and then floats as soon as the water level rises sufficiently high in film form between the ice and the inner surface 106 of the mound wall. These glasses 100 may be nested as indicated by the bottom line 110 of a contained glass. The ice in the mound 102 is surrounded by the liquid in the glass except at the bottom where it is further protected from the surrounding atmosphere by the supporting surface on which it rests. So insulated it will be slow melting and long lasting.

Figure 11:
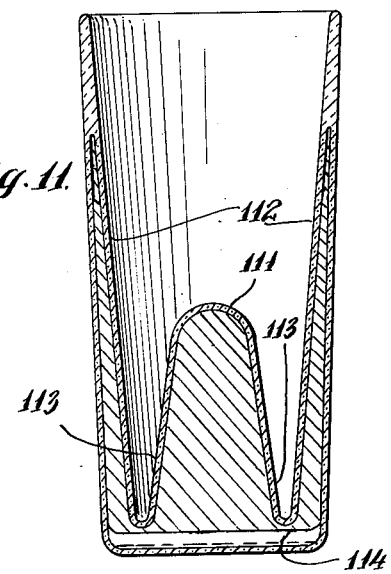

As indicated in Fig. 11, a very strong cooling effect is attained by combining the jacketing with the central mound 111, the inner wall 112 of the jacket being carried around into the mound wall 113 so that the contained liquid is doubly cooled. This construction is preferably frozen in inverted position with the air cushion forming the base surface 114 of both the outer ring and the inner cone.

Figure 12:
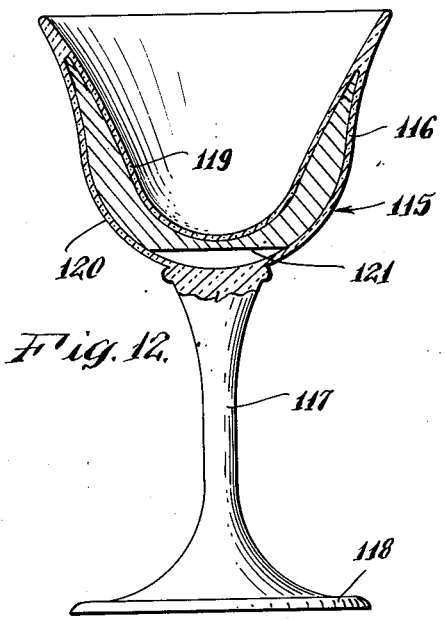

Fig. 12 shows a typical "Cocktail" glass 115 having a bowl 116 and stem 117 and base 118. The jacket is formed by the inner wall 119 following the contour of the outer wall 120 with increasing separation toward the bottom. The ice is formed in inverted position of the glass so that it solidifies with a free surface 121 at the bottom of the bowl in upright position as shown. Here again the water will accumulate as the ice melts and tend to float the ice annulus up toward the inner wall and close to the liquid in the glass.

These drinking receptacles can be made of many types of materials or combinations of material such as glass, metal, plastic, paper, synthetic rubber, etc. For example, the inner wall may be made of thin aluminum and the outer wall of plastic or the inner wall of glass and the outer wall of plex-o-glass etc.

In the construction of these receptacles they can be either molded, sweated, pressed, or cemented together or fused. The entire receptacle with the fluid is then placed in a freezing device such as a refrigerator, a deep freeze unit, or a box containing Dry Ice, etc. The transferring of the cold from the frozen liquid to the drink makes for a more sanitary drink that will not be diluted by melting ice.

The thickness of the liquid jacket can vary depending upon the length of time the receptacle is to stay cold or the number of drinks to be supplied. For instance, in using a wine glass, a small amount of ice would be sufficient—just enough to chill the wine a little.

Various colored fluids can be used in these receptacles, that is the transparent ones, for desirable effects. Also in the transparent containers the ice expansion fillers or cushions can have very attractive designs or printed matter that will be visible through the outer wall. These cushions can also be placed in the middle of the liquid or near or on the outer wall, thereby serving as an insulator for the outer wall.

The liquid to be used may be plain water, boiled water or distilled water and may be a chemical solution that would have a freezing point different from that of water.

A cushion for the expansion of ice to absorb the pressure from both walls can be used in all types of containers and can be made from different materials such as cork, rubber, cellophane, plastic, or a soft glass or a like composition (paper) that would be pliable in order to cushion the pressure of the ice formation within the glass. This cushioning material also can be made in a fluid or paste form and sprayed on the inside of the outer wall to any desired thickness for an expansion absorber but also providing an insulating substance for the outer wall. It could be made in a one-piece cylinder with an attached bottom and could be solid or tubular, or it could be made in two sections—a tubular (sealed) cylinder and a separate tubular bottom also sealed. It can also be made into a cylinder made from spiral tubing or solid material, the bottom piece made into a small solid, compressible disc such as cork, rubber, etc.

These cushions could be fitted on the inside of the outer wall and on the bottom of the glass or they could be fitted in the center of the fluid to take the pressure there in the process of freezing.

The air space for expansion near the lip of the glass could be filled with absorbing material, thereby causing no movement of the fluid to one side when the glass is placed on its side. This could be in the shape of a solid ring above the liquid.

With receptacles of paper, metal or plastic, etc., the ice expansion absorber will not necessarily have to be used as the materials in these have enough flexibility to compensate for the expansion but they could be used in order to insulate the outside wall. Both the inner wall and the outer wall can be beaded or pleated horizontally or vertically for expansion purposes.

With glass containers it is important to maintain in the freezing liquid the tendency to melt and slip under pressure. The rate of freezing being slow—a matter of many minutes—the water is at the critical point of solidification for an appreciable interval. If at this time its expansion develops pressure, a relatively small pressure rise will arrest the solidification and develop a liquid or semi liquid film along which the expansion will progress in a direction of lesser pressure. In this way the solidification creeps toward the surface of the liquid mass unless obstructed.

In the examples given the freezing liquid is in contact with the air or other cushion and this combined with the slow freezing permits the expansion to fit itself within the glass jacket by the development of only moderate pressures and without fracture of the jacket walls.

To attain the desired slow freezing the chilling temperature in still air is maintained only moderately below 32° F. and preferably not much less than 10° F. since low temperatures continue to expand the frozen mass and subject the glass jacket walls to increasing stresses.

With other less fragile and more resilient materials and where the material of the outer wall is of lower coefficient of expansion lower freezing temperatures may be employed with lessening of the time required to complete the solidification. This is also true of such of the glass containers as present widely diverging compartment walls.

In fabricating the containers the inner and outer vessels may first be cast or molded and then assembled and fused together leaving an opening for the subsequent supply of the jacket liquid or such opening may be later provided and in either case finally closed as by fusing.

The system of this invention provides a lasting chill for liquids and other foodstuffs or any material to be kept cool for serving or consumption. Depending on the room temperatures involved and the physical characteristics of the container and refrigerant, the contents will be maintained at desired level over periods up to and even exceeding one-half hour.

The temperature of the chilled contents may be controlled to determine it within any desired range most suited to the particular material. For instance, beer in general will be most tasty at about 40° to 45° F., the aroma being more noticeable at 45° F. and above. Consequently, with the "Beer" glass of Fig. 9 the volume of the jacket should be sufficient to give an initial temperature of about 40° F. with some slight melting of the jacket ice as the drink is poured. Thereafter, the effect will be to maintain the temperature in the lower ranges for a considerable period until as the ice is melted the temperature will gradually rise.

The contents of the container do not come into contact with the ice and are not diluted or otherwise changed in composition. The used glass is washed and returned to the freezing compartment and left usually to chill to complete solidification of the jacket liquid. It is then available for reuse, the drink being poured into it shortly after it is taken from the freezer though it may be left to partially melt the ice where experience has shown that the complete ice content results in undesirably low temperature for the liquid being served.

In the construction of the receptacle, for instance of Figs. 4, 7, 8, 11 and 12, the outer end inner portions may first be made and then joined. In Fig. 13 the inner glass 130 has a bead 131 and is set within the outer glass 132 containing liquid 133 reaching the level 134 in assembled position with the lip 135 of the outer glass in engagement with the bead 131, the lower portions of the glasses completing the jacket between them as shown in Fig. 4, for example. The line of contact 131, 135 is then welded by heating preferably by a flame with relative movement around the receptacle to produce an airtight seal fastening the inner and outer glasses together.

In Fig. 14 a receptacle of the type shown in Figs. 4, 7, 8 and 11 is formed with the inner and outer glasses 140, 141 molded or cast together but with the bottom of the outer glass open, as shown, to be closed by a separate bottom piece 142 after the jacket has been partially filled with the liquid 143 to be frozen. As illustrated in Figs. 15 and 16 the meeting edges 144, 145 of the bottom and glass may be formed to provide a groove 146 which is welded closed by a melting flame (Fig. 16).

A receptacle of the type shown in Figs. 1 and 9 may be provided by forming the outer and inner portions 148, 149 together (Fig. 17) with the upper edges spaced apart by the open annulus 150. Then after filling with the desired amount of liquid the inner edge 151 is expanded into contact with the outer edge 152 by heating and welding to join these edges together (Fig. 18). Similarly with receptacles of this type the upper or lip portions may be initially cast or molded together leaving the bottom edges free and open to be then closed with the receptacle in inverted position after the liquid has been filled in to the desired amount.

In forming a receptacle of the type shown in Fig. 10 the outer and inner portions 155, 156 may be cast or molded together (Fig. 19) but with the bottom of the inner portion open as shown. The inner compartment may then be partially filled with liquid and the bottom completed by welding in place the circular piece 157 (Fig. 20).

We claim:

A drinking glass consisting of an outer portion generally cylindrical around a vertical axis and extending upward from a bottom part integral with said outer portion, and an inner structure having an inverted central cup-shaped portion symmetrical around said vertical axis and opening downward to provide a central chamber closed at the top and having its lower open edge spaced from said bottom part of said glass and supported at said edge by a surrounding wall extending upward at an angle to said outer portion and merging therewith at a point below the uppermost edge thereof to provide an annular chamber closed at the top and surrounding said central chamber and opening downward above the said bottom part and at the level of said lower edge so that there is a bottom space connecting said central and annular chambers, and a freezable liquid in said chambers and bottom space.

THOMAS P. LANDERS.
CHARLES F. SMITH.

REFERENCES CITED

The following references are of record in the file of this patent:

UNITED STATES PATENTS

| Number | Name | Date |
|---|---|---|
| 1,004,259 | Higbee | Sept. 26, 1911 |
| 1,056,971 | Coleman | Mar. 25, 1913 |
| 1,771,186 | Mock | July 22, 1930 |
| 1,961,936 | Mallinckrodt, Jr. et al. | June 5, 1934 |
| 2,039,736 | Munters et al. | May 5, 1936 |
| 2,187,558 | Kushima | Jan. 16, 1940 |
| 2,238,512 | Uline | Apr. 15, 1941 |
| 2,288,044 | Stemme | June 30, 1942 |
| 2,449,478 | Herzog | Sept. 14, 1948 |

FOREIGN PATENTS

| Number | Country | Date |
|---|---|---|
| 1,751 | Great Britain | A. D. 1867 |
| 10,924 | Switzerland | 1895 |
| 452,422 | France | 1913 |